US006539912B1

(12) United States Patent
Beer

(10) Patent No.: US 6,539,912 B1
(45) Date of Patent: Apr. 1, 2003

(54) OIL PAN FOR ENGINES OR TRANSMISSIONS

(75) Inventor: Markus Beer, Morsbach (DE)

(73) Assignee: IBS Filtran Kunstsoff-/Metallerzeugnisse GmbH, Morsbach (DE)

( * ) Notice: Subject to any disclaimer, the term of this patent is extended or adjusted under 35 U.S.C. 154(b) by 0 days.

(21) Appl. No.: 10/048,552

(22) PCT Filed: Dec. 6, 2000

(86) PCT No.: PCT/EP00/12250

§ 371 (c)(1),
(2), (4) Date: Jan. 31, 2002

(87) PCT Pub. No.: WO01/63100

PCT Pub. Date: Aug. 30, 2001

(30) Foreign Application Priority Data

Feb. 24, 2000 (DE) .......................................... 100 08 692

(51) Int. Cl.⁷ ............................................... F01M 11/00
(52) U.S. Cl. .................................................. 123/196 R
(58) Field of Search ........................ 123/196 R, 196 A; 4/251.1

(56) References Cited

U.S. PATENT DOCUMENTS 3,888,228 A * 6/1975 Koivunen ............... 123/196 R
5,298,158 A * 3/1994 Anderson ................ 123/196 A
5,809,963 A * 9/1998 Saito ....................... 123/196 R
5,934,241 A * 8/1999 Von Esebeck et al. .. 123/196 R
5,975,041 A * 11/1999 Narita et al. ............ 123/196 R
6,378,639 B1 * 4/2002 Murray ........................ 4/251.1
6,446,275 B1 * 9/2002 Wright et al. ................ 4/251.1

* cited by examiner

Primary Examiner—Noah P. Kamen
Assistant Examiner—Jason Benton
(74) Attorney, Agent, or Firm—Baker & Hostetler LLP

(57) ABSTRACT

A plastic oil pan (1) for engines or transmissions with integrated suction oil filter and integrated pressure oil filter, wherein parts of the oil pan (1) form the base for suction oil filter housing (2) and pressure oil filter housing (7), wherein a one-component or multi-component cover (3, 8) is arranged as oil filter upper tray (3, 8) for the suction oil filter housing (2) and the pressure oil filter housing (7), and wherein at least one pressure oil filter inlet (10) is arranged at the pressure oil filter side and at least one suction oil filter outlet (5) at the suction oil filter side in the oil filter upper tray, wherein a one-component or multi-component oil filter medium (4, 9) is arranged between oil pan (1) and oil filter upper tray (3, 8), wherein a suction oil filter inlet (6) is arranged beneath the suction oil filter medium (4) and a pressure oil filter outlet (11) is arranged beneath the pressure oil filter medium (9), and wherein the pressure oil filter outlet (11) and the suction oil filter inlet (6) form a functional unit.

14 Claims, 2 Drawing Sheets

OIL PAN FOR ENGINES OR TRANSMISSIONS

Figure 1:
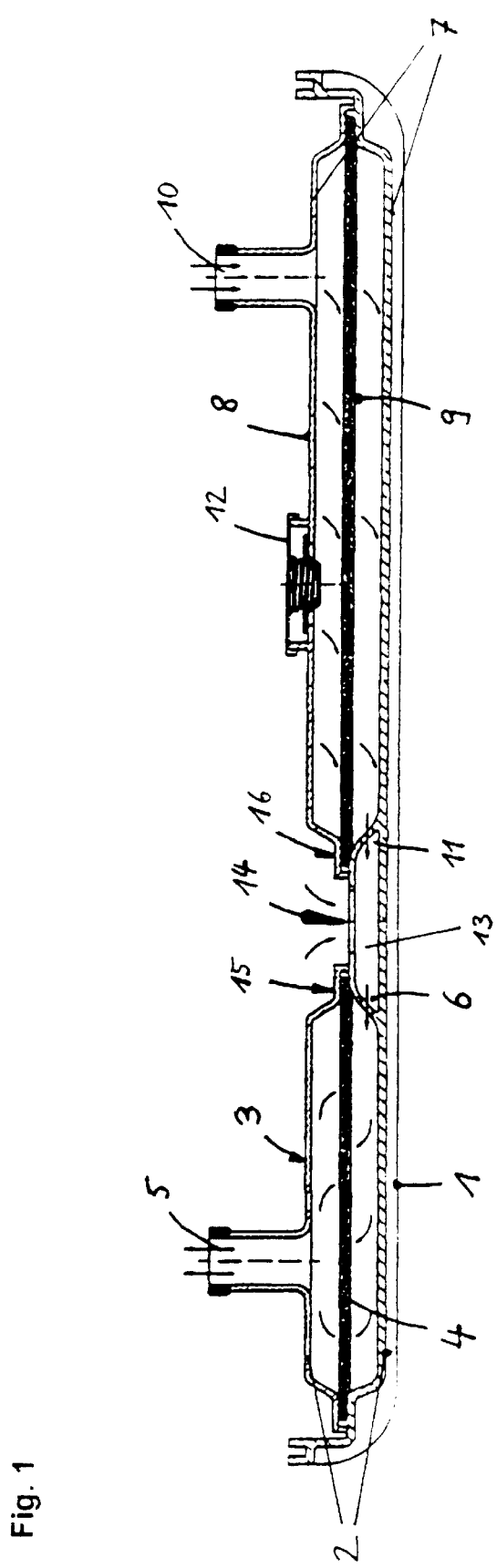

The invention is directed to a plastic oil pan for engines or transmissions with integrated suction oil filter and with integrated pressure oil filter.

Various types of oil filters for engines or transmissions are already known from prior art. Well-known filters generally consist of a flat filter housing comprised of two half-trays. A disc-shaped or bag-shaped or a folded filter medium, e.g. a metal screen, a paper filter, or a polyester filter felt, is fixed between the two half-trays. Also, the filter half-trays joined together in an airtight fashion can be made of metal or plastic or of a combination of plastic tray or metal tray.

According to prior art, oil filtration in an engine or an automatic transmission is effected using filters arranged separately outside the oil pan. To this end, the filter, oil pan seal and oil pan are used as single components. Here, the oil pan either is made of deep-drawn steel or cast aluminum/ magnesium.

In the prior art, the oil filters generally are arranged in a way so as to be easily accessible and replaceable or removable during maintenance works. In most of the cases, this is achieved by arranging the oil filters so as to protrude from the engine level. In order to prevent the required space for the oil filter from becoming too large in size, the oil filter size in motor oil filters is severely restricted, so that the oil filters have a small filter surface and require relatively frequent replacement. In the event of automatic transmissions, however, filter systems designed as service life filters are already available.

Another disadvantage is that the space within the engine compartment in new engine constructions is highly limited in general, and therefore, such bulky constructions are undesirable and disadvantageous per se.

The applicant's German patents 197 35 444.0 and 197 35 445.9 relate to advanced developments regarding oil pan and oil filter for engines and transmissions, wherein the oil filter is arranged within the oil pan. The applicant's patent 197 35 445.9 describes the integration of a suction oil filter in an oil pan made of plastic. Therein, an additional pressure oil filter with a pleated star-shaped pressure filter medium can be arranged outside the oil pan in the engine compartment in a conventional fashion.

This is disadvantageous in that the oil purified by the pressure oil filter undergoes remixing with dirtied oil from the oil sump in the oil pan, before the oil in order to be purified reaches the suction oil filter arranged in the oil pan. Another drawback is oil foaming in the pressure oil filter as a result of uncontrolled oil guiding.

Therefore, the technical object of the invention was to provide an oil pan for engines or transmissions, which avoids the above-mentioned drawbacks and allows space-saving accommodation within the construction in engine or transmission. In addition, such oil filters are to be provided with a larger filter surface, rendering frequent replacement unnecessary. Furthermore, mixing of oil purified by the pressure oil filter with dirtied oil is to be avoided. Also, oil foaming due to filtration should be minimized.

Said technical object is accomplished by means of a plastic oil pan 1 for engines or transmissions with integrated suction oil filter and integrated pressure oil filter, wherein parts of the oil pan 1 form the base for suction oil filter housing 2 and pressure oil filter housing 7, wherein a one-component or multi-component cover 3, 8 is arranged as oil filter upper tray 3, 8 for the suction oil filter housing 2 and the pressure oil filter housing 7, and wherein at least one pressure oil filter inlet 10 is arranged at the pressure oil filter side and at least one suction oil filter outlet 5 at the suction oil filter side in the oil filter upper tray, wherein a one-component or multi-component oil filter medium 4, 9 is arranged between oil pan 1 and oil filter upper tray 3, 8, wherein a suction oil filter inlet 6 is arranged beneath the suction oil filter medium 4 and a pressure oil filter outlet 11 is arranged beneath the pressure oil filter medium 9, and wherein the pressure oil filter outlet 11 and the suction oil filter inlet 6 form a functional unit. Said functional unit of pressure oil filter outlet 11 and suction oil filter inlet 6 is significant in flow-related terms.

The advantage of this invention consists in the integration of a combined suction and pressure oil filtration in an oil pan made of plastic, the oil flow being optimized by an optimum arrangement of both filters in the oil pan at the shortest possible distance to each other. This is advantageous in that mixing of the oil purified by the pressure oil filter with dirtied oil from the oil sump is prevented by passing the purified oil to the suction oil filter on the shortest possible path. In addition, foaming of the oil is minimized by controlled guiding of the oil on the pressure side from the pump and into the pressure filter. Moreover, a larger filter surface is provided, rendering frequent replacement unnecessary.

In another embodiment, the pressure oil filter outlet 11 and the suction oil filter inlet 6 constitute openings of a chamber 13. An additional oil inlet 14 is preferably arranged on chamber 13. Under operating conditions wherein 100 % of the oil volume flow cannot be passed through the pressure filter, e.g. in cold starting, this enables performing an oil volume compensation from the oil pan sump through said additional oil inlet 14. As a result, proper functioning of the oil circulation to the pump is ensured.

In a particularly preferred embodiment, at least one bypass valve 12 is arranged on the pressure oil filter upper tray 8 and/or on the suction oil filter upper tray 3 and/or on or in the oil filter medium. This is particularly advantageous in ensuring the cold flow properties of the system because a higher pressure difference is present especially in the pressure oil filter as a result of the substantially finer filtration in the pressure oil filter medium. On the suction oil filter side, as well as on the pressure oil filter side, these bypass valves can be designed in optimal fashion by conventionally using a metal helical spring or by using a temperature-dependent bypass design.

In a particularly preferred embodiment, flow ribs are arranged in the oil pan 1, which serve to support a directional oil flow.

In another particularly preferred embodiment, support ribs are arranged on the outside of oil pan 1. They are advantageous in that the oil pan can be placed on the ground without the risk of damage. Preferably, stone guard ribs are arranged in addition so as to prevent exterior damage of the oil pan by impacting rocks.

At least one oil drain screw preferably is arranged in the oil pan 1 so as to allow draining of the oil out of the oil pan.

Also, in a preferred embodiment, magnets are arranged in oil pan 1 and/or suction oil filter housing 2 and/or pressure oil filter housing 7. In this way, abraded metal is captured, thus prolonging the function of the oil filter media and reducing wear of the moving parts in the engine or transmission.

In a particularly preferred embodiment, the oil pan 1 is secured on block to the transmission or to the engine. Preferably, a T-shaped seal or a segment seal is arranged between the oil pan 1 and the engine or the transmission. Additional sensors are preferably integrated in the oil pan.

In a particularly preferred embodiment, the oil filter media are flat, folded or pleated filter media.

In another particularly preferred embodiment, the cover of the oil filter housing 2, 7 of the suction oil filter and pressure oil filter is formed by a common, one-piece oil filter upper tray 3, 8. It is particularly advantageous that the number of component parts is further reduced, enabling a reduction in overall weight and in cost of assembly.

The oil pan according to the invention provides a space-saving alternative to conventional arrangements of the oil filter within the construction, i.e., in the engine or in the transmission. By integrating the above-described elements in the oil pan, a compact structural unit is formed, enabling a stable filtration system that is functional throughout the service life of the vehicle, so that frequent replacement is unnecessary. In terms of its filter surface, the oil pan of the invention even allows a design where replacement of the filter is no longer necessary during the average service life of the respective vehicle. Another advantage is that the space within the oil pan, which has not been utilized anyway, now is made useful, and that space is gained by dislocating the oil filter from the engine compartment.

Furthermore, the number of required component parts is minimized, thereby reducing the overall weight of the vehicle.

The subject of the invention will be illustrated in more detail in the following figures.

FIG. 1. shows a cross-sectional view of the oil pan according to the invention.

Figure 2:
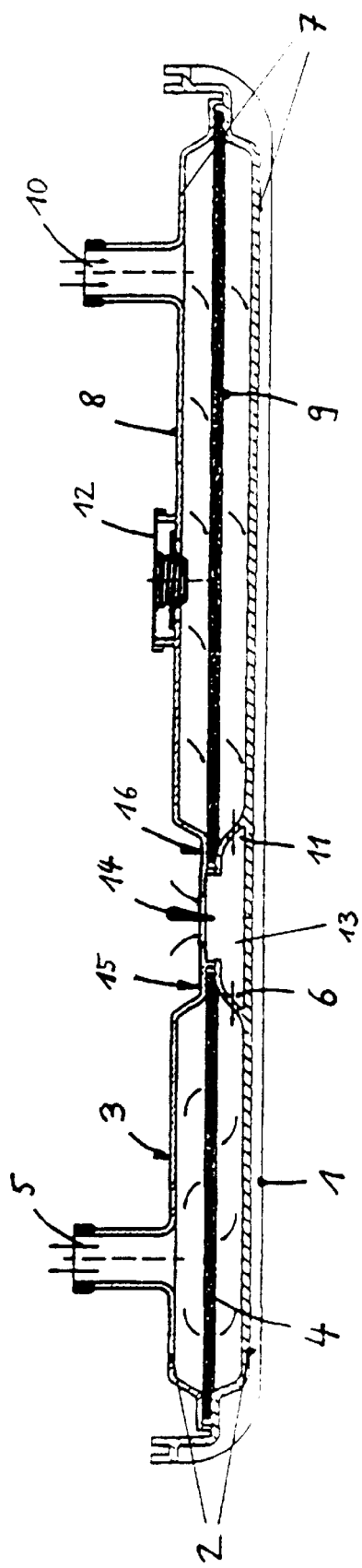

FIG. 2. shows a cross-sectional view of another embodiment of the oil pan according to the invention.

FIG. 1 shows a cross-sectional view of the oil pan according to the invention. The oil pan 1 includes an integrated suction oil filter and an integrated pressure oil filter, parts of the oil pan 1 forming the base for the housing of suction oil filter 2 and pressure oil filter 7. The cover of these housings is constituted by the suction oil filter upper tray 3 and the pressure oil filter upper tray 8. In the respective oil filter upper tray, a pressure oil filter inlet 10 is arranged at the pressure oil filter side and a suction oil filter outlet 5 at the suction oil filter side. Oil filter media 4, 9 are arranged between oil pan 1 and oil filter upper tray 3, 8. A suction oil filter inlet 6 is provided beneath the suction oil filter medium 4, and a pressure oil filter outlet 11 is provided beneath the pressure oil filter medium 9. The pressure oil filter outlet 11 and the suction oil filter inlet 6 constitute openings of a chamber 13. In the embodiment as shown, the chamber 13 has an additional oil inlet 14. Furthermore, a bypass valve 12 is arranged on the pressure oil filter upper tray 8 in this example. FIG. 2 shows a cross-sectional view of another embodiment of the oil pan according to the invention. In contrast to the oil pan illustrated in FIG. 1, the cover of the respective oil filter housing 2 and 7 of the suction oil filter and pressure oil filter is designed as a common, one-piece oil filter upper tray 3, 8. This can be seen in FIG. 2 in the region of oil inlet 14 of chamber 13.

What is claimed is:

1. A plastic oil pan for engines or transmissions with integrated suction oil filter and integrated pressure oil filter, wherein parts of the oil pan form the base for suction oil filter housing and pressure oil filter housing, wherein a one-component or multi-component cover is arranged as oil filter upper tray for the suction oil filter housing and the pressure oil filter housing, and wherein at least one pressure oil filter inlet is arranged at the pressure oil filter side and at least one suction oil filter outlet at the suction oil filter side in the oil filter upper tray, wherein a one-component or multi-component oil filter medium is arranged between oil pan and oil filter upper tray, wherein a suction oil filter inlet is arranged beneath the suction oil filter medium and a pressure oil filter outlet is arranged beneath the pressure oil filter medium, and wherein the pressure oil filter outlet and the suction oil filter inlet form a functional unit.

2. The oil pan according to claim 1, characterized in that the pressure oil filter outlet and the suction oil filter inlet are openings of a chamber.

3. The oil pan according to claim 1, characterized in that an additional oil inlet is arranged on chamber.

4. The oil pan according to claim 1, characterized in that at least one bypass valve is arranged on the pressure oil filter upper tray and/or on the suction oil filter upper tray and/or on the oil filter medium and/or in the oil filter medium.

5. The oil pan according to claim 1, characterized in that flow ribs are arranged on the oil pan.

6. The oil pan according to claim 1, characterized in that support ribs are arranged on the outside of oil pan.

7. The oil pan according to claim 1, characterized in that stone guard ribs are arranged on the outside of oil pan.

8. The oil pan according to claim 1, characterized in that at least one oil drain screw is arranged in oil pan.

9. The oil pan according to claim 1, characterized in that magnets are arranged in oil pan and/or suction oil filter housing and/or pressure oil filter housing.

10. The oil pan according to claim 1, characterized in that sensors are arranged in addition.

11. The oil pan according to claim 1, characterized in that the oil pan is secured on block to the transmission or to the engine.

12. The oil pan according to claim 1, characterized in that a T-shaped seal or a segment seal is arranged between the oil pan and the engine or the transmission.

13. The oil pan according to claim 1, characterized in that the oil filter media are of a flat, folded or pleated design.

14. The oil pan according to claim 1, characterized in that the cover of the oil filter housing of the suction oil filter and pressure oil filter is formed by a common, one-piece oil filter upper tray.

* * * * *